Feb. 6, 1968     A. F. BOHNHOFF     3,367,456

TORQUE SENSITIVE BRAKE

Filed Dec. 30, 1965

INVENTOR.
Arthur F. Bohnhoff
BY
R. L. Phillips
ATTORNEY

United States Patent Office 3,367,456
Patented Feb. 6, 1968

3,367,456
TORQUE SENSITIVE BRAKE
Arthur F. Bohnhoff, Saginaw, Mich., assignor to General Motors Corporation, Detroit, Mich., a corporation of Delaware
Filed Dec. 30, 1965, Ser. No. 517,666
10 Claims. (Cl. 188—134)

ABSTRACT OF THE DISCLOSURE

A torque sensitive brake for limiting the torque transmitted in a drive train to a predetermined value. The brake is operated by a torque responsive spring loaded ball-ramp drive train connection which drivingly connects the drive train's input and output.

---

This invention relates to a brake and more particularly to a torque sensitive brake for limiting the torque transmitted in a drive train.

When a motor torque is transmitted by a drive train to an actuator to move a load, for example, and an excessive torque is required by the driven mechanism, it is sometimes desirable to stall the motor rather than to disconnect the drive train. The operator must then reset the motor circuit thereby availing him of the opportunity to inspect the reason for such excessive loads as distinguished from torque limiting couplings of the type which would cycle if the excessive loading is of an intermittent nature and permit possible damage to the apparatus.

The principle of this invention lies in a torque sensitive brake for limiting the torque transmitted in a drive train to a predetermined value by braking the drive with a brake operating, torque responsive drive train coupling. In a preferred construction the torque from a motor having an overload switch is applied to a coupling input collar where it is transmitted by a spring loaded, ball-ramp connection to a coupling output collar; the output collar having a slidable spline connection to an output shaft for torque transmittal to the load. The predetermined torque load which will operate the brake is determined by the spring force, the ramp angle and the brake clearance. When the torque load experienced by the output shaft reaches or exceeds the predetermined torque load, the axial forces produced in the ball-ramp drive connection urge the output collar against the spring force to engage a friction face on the output collar with a grounded friction surface. This brakes the drive and stalls the connected motor, the motor not being harmed at stall since it is provided with the overload switch to open the motor circuit.

An object of this invention is to provide a torque sensitive brake for limiting the torque transmitted in a drive train to a predetermined value by braking the drive.

Another object of this invention is to provide a biased cam drive connection in a drive train for engaging a friction brake at and above a preselected torque load to brake the drive while maintaining the drive connection.

These and other objects of the invention will be more apparent from the following description and drawing in which.

Figure 1:
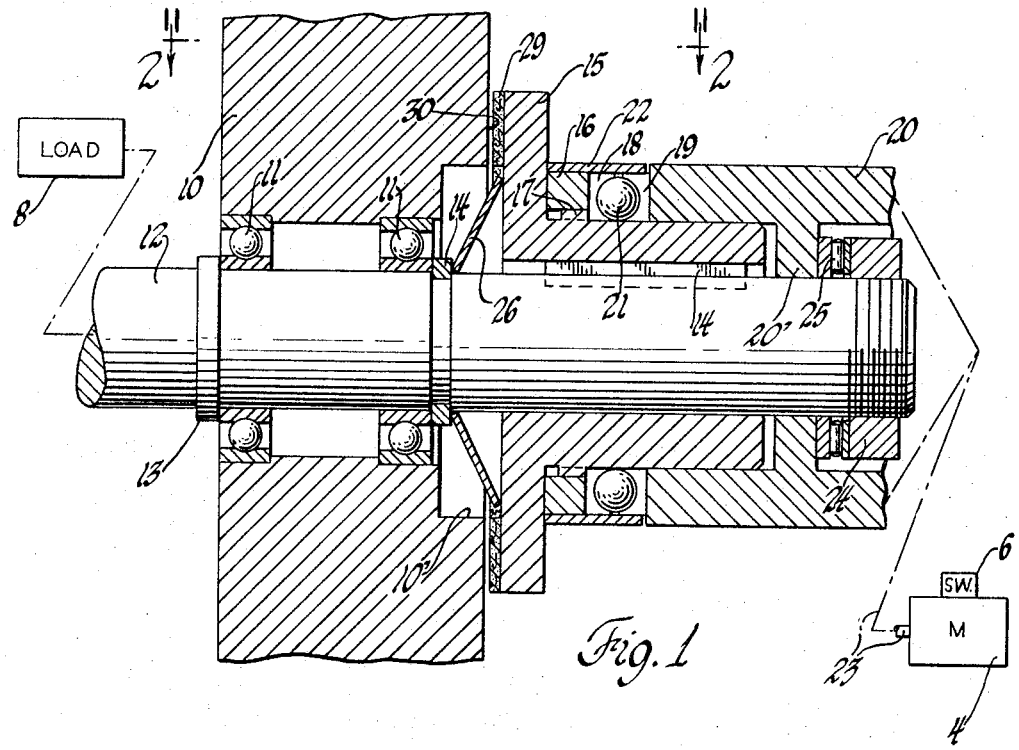
FIG. 1 is a longitudinal view with parts in section of a brake constructed according to the invention; the brake being shown disengaged.

The torque limiting brake is demonstrated as being employed to operate on the drive train connecting an electric motor 4 having an overload switch 6 to a load 8 which may be an actuator mechanism for controlling the wing flap of an airplane. The torque limiting device comprises a stationary support 10 having a pair of anti-friction bearings 11 rotatably supporting a shaft 12 connected to load 8. Retainer rings 13 and 14 by their mounting on shaft 12 and contact with the respective inner races of bearings 11 locate shaft 12 in a fixed axial position. The right end of shaft 12 projects beyond support 10 and is keyed by a slidable drive key connection 14 to a coupling output collar 15 having a ring 16 secured thereto by a spline connection 17.

Ring 16 has pairs of ramps 18 provided by V-shaped notches circumferentially spaced about the ring's right end face for cooperating with pairs of ramps 19 provided by corresponding notches in the left end face of a coupling input collar 20. Collar 20 is received on the hub of collar 15 and has a radially inwardly extending hub 20' received on shaft 12, the collar 20 being connected by a shaft 23 to motor 4. The opposed pairs of notches leave circumferentially spaced pockets in which balls 21 are mounted and retained therein by a retainer ring 22, the cooperating balls and ramps providing a permanent drive connection connecting the coupling collars 20 and 15. A nut 24 threaded on the right end of shaft 12 takes the reaction of a needle thrust bearing 25 bearing on hub 20' to hold the input collar 20 against rightward movement which movement is urged through the ball-ramp drive connection 18, 19 and 21 by a Belleville or diaphragm spring 26 received on shaft 12 and operating in an annular recess 10' in the right side of support 10. The inner radius edge of the spring is held against leftward movement relative to shaft 12 by the retainer ring 14 and has its outer radius edge acting on the output collar 15. Spring 26, in addition to preloading the ball-ramp drive connection, also maintains running clearance in the friction brake which is provided by a friction ring 29 secured to collar 15 and contactable with a friction face 30 provided by support 10. The predetermined torque load capacity of the device is determined by the spring force, the slope of the ramps 18 and 19 and the amount of clearance in the brake which clearance is determined by the positioning of the nut 24. The assembly is determined to broadly meet the application requirements and the nut 24 serves for fine adjustment of the torque load capacity.

Figure 2:
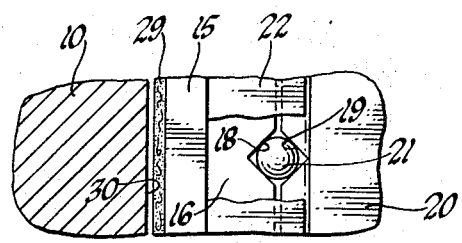
FIG. 2 is a view taken on the line 2—2 in FIG. 1.
Figure 3:
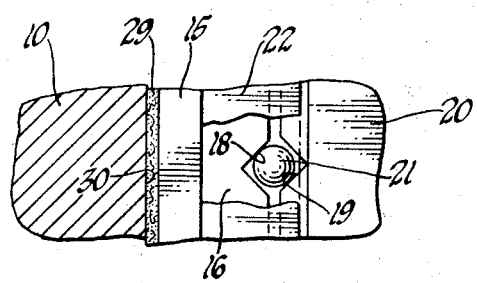
FIG. 3 is a view similar to FIG. 2 but shows the brake engaged.

Describing now the operation, torque is applied by the motor 4 to the input collar 20 where it is transmitted by the ramps 19 through the balls 21 to the ramps 18 and then through the slideable key connection 14 to shaft 12 to drive the load 8. As long as the torque required by the load 8 is below the predetermined torque load, the spring 26 maintains running clearance in the brake assembly and the drive and torque transmittal continue with the coupling positioned as shown in FIGS. 1 and 2. When an excessive torque at or above the predetermined torque load is required by the load 8, the axial forces acting on the ball-ramp drive connection causes each load carrying ramp 18 to ride up each load carrying ramp 19 on their associated ball 21 as shown in FIG. 3 to move collar 15 leftwardly against the spring force of spring 26 and cam the friction ring 29 to contact the friction face 30 to engage the brake. Such operation will occur regardless of the direction of shaft 12 rotation since the flat ramps 18 and 19 at the V-notches are at equal angles to planes passing through the shaft axis, i.e., a plane passing through the shaft axis and the apex of a V-notch bisects the included notch angle. The brake clearance is sufficiently small so that collar 15 movement does not permit the balls to roll off ramps 19 and break the drive connection. The braking operation brakes the drive and stalls the connected motor 4 which is not harmed since the overload switch 6 will open the motor circuit. Since the overload switch has been operated, the operator must reset the circuit for subsequent motor operation thus giving the operator an opportunity to determine the cause for the excessive torque load and to remedy the problem. Relief of the excessive torque load permits the spring to disengage the brake for subsequent operation.

The above-described preferred embodiment is illustrated in the invention which it will be appreciated may be modified within the scope of the appending claims.

I claim:

1. In a device for limiting torque transmittal the combination of an input member; an output member; a brake and torque responsive, preloaded ball-ramp drive connecting means continuously operatively drivingly connecting said members and operatively connected to said brake for normally transmitting torque between said members while maintaining said brake disengaged below a predetermined torque and for engaging said brake to retard said members at and above said predetermined torque while continuing to connect said members.

2. The device set forth in claim 1 and said torque responsive, preloaded ball-ramp drive connecting means comprising a spring biased, ball V-shaped ramp drive connection.

3. The device set forth in claim 2 and said drive connection including disengageable, cooperating ramp means on said members for connecting said members; one of said ramp means being slidably connected to one of said members and biased to disengage said brake and urged by cooperation with the other ramp means against the bias to engage said brake.

4. In a device for limiting torque transmittal the combination of an input member; an output member; a brake; torque responsive, preloaded cam drive connecting means continuously operatively drivingly connecting said members and operatively connected to said brake for normally transmitting torque between said members while maintaining said brake disengaged below a predetermined torque and for engaging said brake to retard said members at and above said predetermined torque while continuing to connect said members; said torque responsive, preloaded cam drive connecting means comprising cooperating ramp means on said members for transmitting torque between said members; one of said ramp means including a coupler slidably connected to one of said members and connected to operate said brake while transmitting torque between said members; a spring preloaded to operatively engage said ramp means under load and hold said coupler in a position to disengage said brake and permit said coupler to be moved to engage said brake by the ramp action of said ramp means at a predetermined torque load acting on said ramp means.

5. The device set forth in claim 1 and a motor connected to drive said input member; a load connected to be driven by said output member; motor overload means operatively connected to said motor to stop motor operation when a torque overload occurs.

6 The device set forth in claim 1 and an electric motor connected to drive said input member; a load connected to be driven by said output member; and overload switch operatively connected to said motor to open the motor circuit to stop motor operation when a torque overload occurs.

7. In a device for limiting torque transmittal the combination of an input member; an output member; a brake and torque responsive coupling means operatively connecting said members and operatively connected to said brake for maintaining said brake disengaged below a predetermined torque transmitted by said coupling means and for engaging said brake to retard said members at and above said predetermined torque; said torque responsive coupling means comprising cooperating ramp means on said members for transmitting torque between said members, one of said ramp means including a coupler slidably connected to one of said members and connected to operate said brake while transmitting torque between said members; a spring preloaded to operatively engage said ramp means under load and hold said coupler in a position to disengage said brake and permit said coupler to be moved to engage said brake by the ramp action of said ramp means at a predetermined torque load acting on said ramp means; and said ramp having ramps provided by corresponding V-notches on said ramp means; an anti-friction element mounted in each pair of corresponding V-notches for providing rolling ramp action.

8. The device set forth in claim 7 and said anti-friction elements being balls.

9. In a device for limiting torque transmittal the combination of an input member; an output member; a brake and torque responsive coupling means operatively connecting said members and operatively connected to said brake for maintaining said brake disengaged below a predetermined torque transmitted by said coupling means and for engaging said brake to retard said members at and above said predetermined torque; and said torque responsive coupling means comprising an annular input collar connected to said input member and supported on said output member; and annular output collar supported on said output member; a slidable key connection for connecting said output collar to said output member for relative axial movement; said collars having corresponding V-notches providing ramps; balls mounted and retained in the spaces provided by the corresponding pairs of V-notches to engage said ramps to provide a permanent ball-ramp drive connection connecting said members; a diaphragm spring mounted on said output member and prestressed to urge said output collar to load said ball-ramp drive connection; a stationary member having a friction surface; said output collar having a friction surface held from contact with said stationary friction surface by the bias of said spring when the torque transmitted by said ball-ramp drive connection is in a predetermined torque range and urged against the bias of said spring to contact said stationary friction surface by the ball-ramp action of said ball-ramp drive connection above said predetermined torque range.

10. The device set forth in claim 9 and means for varying the clearance between said friction surfaces.

References Cited

UNITED STATES PATENTS

| 2,734,590 | 2/1956 | Hays | 188—162 X |
| 2,783,861 | 3/1957 | Jungles | 188—134 X |
| 3,219,154 | 11/1965 | Schenk et al. | 188—134 |

FOREIGN PATENTS

| 77,699 | 8/1919 | Austria. | |

DUANE A. REGER, *Primary Examiner.*